(12) United States Patent
Patel et al.

(10) Patent No.: US 10,276,025 B2
(45) Date of Patent: *Apr. 30, 2019

(54) SPATIAL TELEMETER ALERT RECONNAISSANCE SYSTEM

(71) Applicant: AT&T Intellectual Property I, L.P., Atlanta, GA (US)

(72) Inventors: Bhumit Patel, Atlanta, GA (US); Chad Jordan, Atlanta, GA (US); Nigel Bradley, McDonough, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/996,783

(22) Filed: Jun. 4, 2018

(65) Prior Publication Data
US 2018/0276972 A1 Sep. 27, 2018

Related U.S. Application Data

(63) Continuation of application No. 15/286,704, filed on Oct. 6, 2016, now Pat. No. 9,990,830.

(51) Int. Cl.
*G08B 21/18* (2006.01)
*G01F 17/00* (2006.01)
(Continued)

(52) U.S. Cl.
CPC .......... *G08B 21/182* (2013.01); *G01F 17/00* (2013.01); *G06F 1/00* (2013.01); *G06Q 10/087* (2013.01);
(Continued)

(58) Field of Classification Search
CPC ....... G08B 21/182; G01F 17/00; G01F 22/00; G06Q 10/087; G06T 7/62; H04Q 9/00; H04Q 2209/823; G06F 1/00
(Continued)

(56) References Cited

U.S. PATENT DOCUMENTS 7,252,230 B1 8/2007 Sheikh
7,558,564 B2 7/2009 Wesby
(Continued)

FOREIGN PATENT DOCUMENTS

CA 2885731 3/2014
CA 2892861 6/2014
(Continued)

OTHER PUBLICATIONS

Spiess et al., "SOA-based Integration of the Internet of Things in Enterprise Services," IEEE International Conference on Web Services, Jul. 6-10, 2009, IEEE, 2009.
(Continued)

*Primary Examiner* — Hirdepal Singh
(74) *Attorney, Agent, or Firm* — Hartman & Citrin LLC

(57) ABSTRACT

Concepts and technologies are disclosed herein for a spatial telemeter alert reconnaissance system ("STARS"). According to one aspect disclosed herein, the STARS can receive, from a spatial mapping and monitoring ("SMM") device, an initial space map for a space in which the SMM device is deployed. The initial space map can include a volume capacity of the space. The STARS can receive, from a user device, at least one space parameter to be utilized for the space in which the SMM device is deployed. The STARS device can update the SMM device in accordance with the space parameter. In some embodiments, the at least one space parameter can include a mapping frequency. The mapping frequency can instruct the SMM device to perform spatial mapping of the space at a specified time interval.

20 Claims, 9 Drawing Sheets

(51) Int. Cl.
*G06F 1/00* (2006.01)
*G06Q 10/08* (2012.01)
*H04Q 9/00* (2006.01)
*G06T 7/62* (2017.01)
*G01F 22/00* (2006.01)

(52) U.S. Cl.
CPC ............... *G06T 7/62* (2017.01); *H04Q 9/00* (2013.01); *G01F 22/00* (2013.01); *H04Q 2209/823* (2013.01)

(58) Field of Classification Search
USPC .................................................. 340/870.09
See application file for complete search history.

(56) References Cited

U.S. PATENT DOCUMENTS

| | | |
|---|---|---|
| 8,219,466 B2 | 7/2012 | Gui et al. |
| 8,280,009 B2 | 10/2012 | Stepanian |
| 8,410,931 B2 | 4/2013 | Petite et al. |
| 9,111,105 B2 | 8/2015 | Barton et al. |
| 9,307,344 B2 | 4/2016 | Rucker et al. |
| 9,344,888 B2 | 5/2016 | Starsinic et al. |
| 9,392,404 B2 | 7/2016 | Daoura et al. |
| 2002/0057208 A1* | 5/2002 | Lin ......................... G01S 13/74 340/8.1 |
| 2003/0093307 A1 | 5/2003 | Renz |
| 2003/0216969 A1 | 11/2003 | Bauer |
| 2008/0097731 A1 | 4/2008 | Lanes et al. |
| 2009/0189788 A1* | 7/2009 | Faus ....................... G08B 25/08 340/989 |
| 2010/0117832 A1* | 5/2010 | Koo ........................ G06Q 10/08 340/572.1 |
| 2010/0156597 A1 | 6/2010 | Stern |
| 2010/0176933 A1 | 7/2010 | Barragan Trevino |
| 2012/0109384 A1 | 5/2012 | Stepanian |
| 2013/0332323 A1 | 12/2013 | Phillips et al. |
| 2013/0339438 A1 | 12/2013 | Cherian et al. |
| 2014/0126581 A1 | 5/2014 | Wang et al. |
| 2014/0184391 A1 | 7/2014 | Elizondo, II |
| 2014/0209676 A1* | 7/2014 | Reynolds ............. G06Q 10/087 235/385 |
| 2014/0244017 A1 | 8/2014 | Freiwirth et al. |
| 2015/0186836 A1 | 7/2015 | Chouhan et al. |
| 2015/0281009 A1 | 10/2015 | Melcher et al. |
| 2016/0087933 A1 | 3/2016 | Johnson et al. |
| 2016/0140526 A1 | 5/2016 | Cummins et al. |
| 2016/0162863 A1 | 6/2016 | Landa |
| 2016/0189174 A1 | 6/2016 | Heath |
| 2016/0198246 A1 | 7/2016 | Gurumohan et al. |
| 2016/0239795 A1* | 8/2016 | Burch, V ................ G01F 17/00 |
| 2017/0116833 A1* | 4/2017 | Beagley ................. G08B 13/19 |
| 2017/0278059 A1* | 9/2017 | Aji ....................... G06Q 10/087 |
| 2018/0060943 A1* | 3/2018 | Mattingly ............ G06Q 10/087 |

FOREIGN PATENT DOCUMENTS

| | | |
|---|---|---|
| CN | 203490732 | 3/2014 |
| CN | 104301862 | 1/2015 |
| CN | 104834288 | 8/2015 |
| EP | 1124211 | 8/2001 |
| JP | 2003040454 | 2/2003 |
| JP | 2003228653 | 8/2003 |

OTHER PUBLICATIONS

Griffiths, Bradley Joseph, "Radio Frequency Identification Queuing & Geo-Location (RAQGEO): A Spatial Solution to Inventory Management at XYZ Logistics, Inc.," Dissertation, University of Southern California, May 2015.
Kim et al., "Smart Integrated Multiple Tracking System Development for IOT based Target-oriented Logistics Location and Resource Service," International Journal of Smart Home, May 2015, vol. 9, No. 5, pp. 195-204, SERSC 2015.
"Discover LG Smart Thinq™ Appliances," LG, lg.com, Jun. 28, 2014.
Mathaba et al., "The use of RFID and Web 2.0 Technologies to Improve Inventory Management in South African Enterprises," The Electronic Journal Information Systems Evaluation, Sep. 2011, vol. 14, Issue 2, pp. 228-241, Academic Publishing International Ltd.
Shahbandi et al., "Sensor Based Adaptive Metric-Topological Cell Decomposition Method for Semantic Annotation of Structured Environments," 2014 13th International Conference on Control, Automation, Robotics, and Vision (ICARCV), Dec. 10-12, 2014.
Akyildiz et al., "Wireless sensor networks: a survey," Computer Networks, Dec. 2001, pp. 393-422, Elsevier Science B.V.
U.S. Office Action dated Mar. 20, 2017 in U.S. Appl. No. 15/286,704.
U.S. Office Action dated Sep. 22, 2017 in U.S. Appl. No. 15/286,704.
U.S. Notice of Allowance dated Jan. 26, 2018 in U.S. Appl. No. 15/286,704.

* cited by examiner

US 10,276,025 B2

SPATIAL TELEMETER ALERT RECONNAISSANCE SYSTEM

CROSS-REFERENCE TO RELATED APPLICATIONS

This application is a continuation of and claims priority to U.S. patent application Ser. No. 15/286,704, entitled "Spatial Telemeter Alert Reconnaissance System," filed Oct. 6, 2016, now U.S. Pat. No. 9,990,830, which is incorporated herein by reference in its entirety.

BACKGROUND

The Internet of Things ("IoT") is a concept of making physical objects, collectively "things," network addressable to facilitate interconnectivity for the exchange of data. The IoT has many applications, one of which is inventory management. Currently there are no universal and well-implemented IoT-enabled inventory management solutions. Although some solutions exist, these systems often require manual intervention, and for this reason, are unlikely to attract large scale use by the average consumer, small businesses, warehouses, and the like.

SUMMARY

Concepts and technologies are disclosed herein for a spatial telemeter alert reconnaissance system ("STARS"). According to one aspect disclosed herein, the STARS can receive, from a spatial mapping and monitoring ("SMM") device, an initial space map for a space in which the SMM device is deployed. The initial space map can include a volume capacity of the space. The STARS can receive, from a user device, at least one space parameter to be utilized for the space in which the SMM device is deployed. The STARS device can update the SMM device in accordance with the space parameter.

In some embodiments, the at least one space parameter can include a mapping frequency. The mapping frequency can instruct the SMM device to perform spatial mapping of the space at a specified time interval. The STARS can receive, from the SMM device and in accordance with the mapping frequency, an updated space map for the space. The updated space map can include an occupied volume of the space. The occupied volume is a portion of the volume capacity that is occupied by at least one item.

In some embodiments, the at least one space parameter can include an occupancy threshold. The occupancy threshold can specify a value for the occupied volume of the space that, when met, causes the STARS to generate an alert and to send the alert to one or more third party services and/or to the user device. The third party service(s) and/or the user device, in response, can perform one or more tasks. In this manner, the space parameters can be defined by a user so as to trigger performance of one or more task(s) responsive to specified threshold occupancies of the space.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
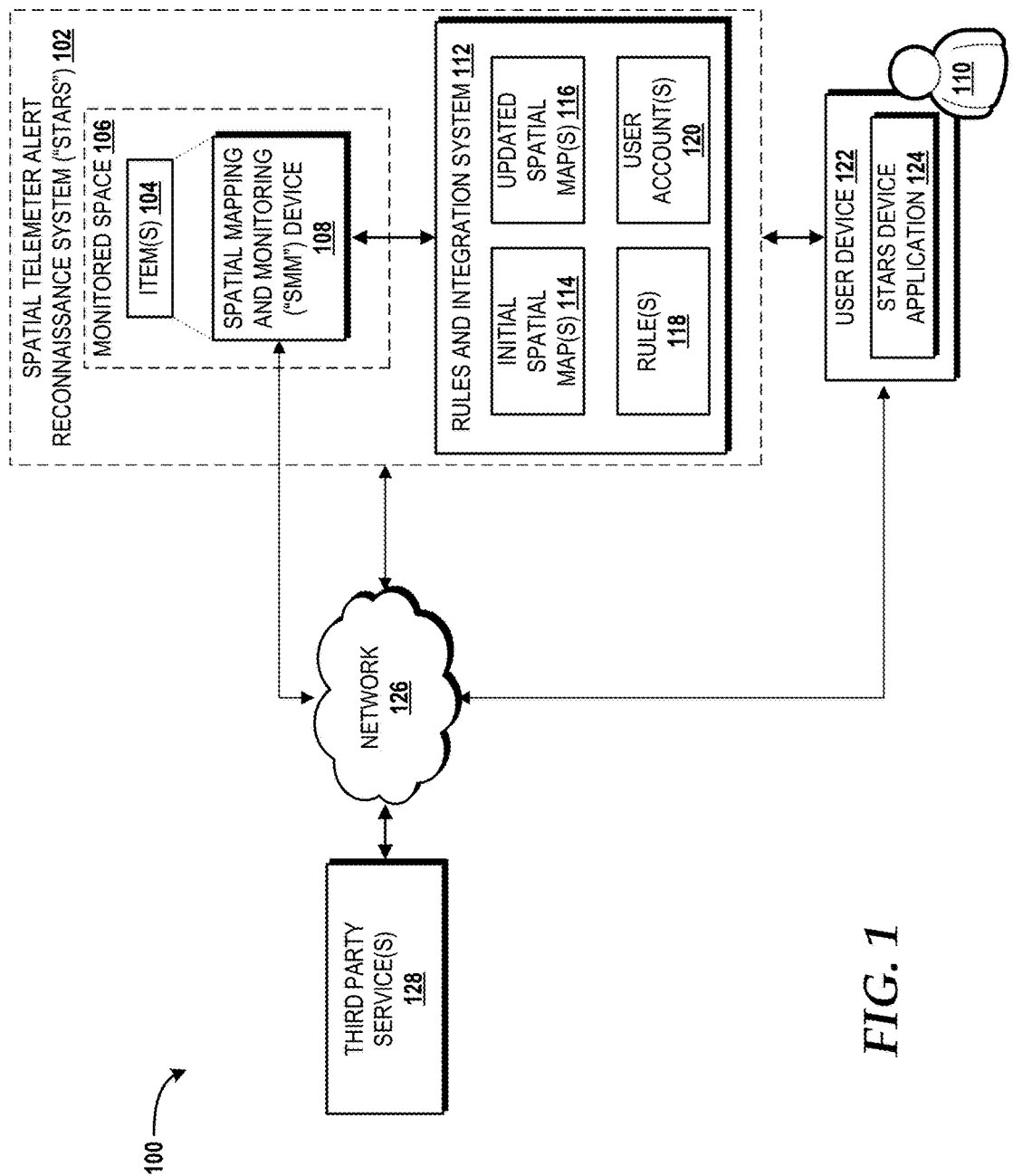
FIG. 1 is a block diagram illustrating aspects of an illustrative operating environment capable of implementing various aspects of embodiments disclosed herein.

The concepts and technologies disclosed herein are directed to a spatial telemeter alert reconnaissance system ("STARS"). STARS encompasses one or more Internet of Things ("IoT")-enabled spatial mapping and monitoring ("SMM") devices deployed within one or more spaces for mapping the spaces and monitoring inventory of items located within the space(s). STARS provides a general purpose solution that is adaptable from home automation to large business inventory management use cases, among others. A user device can interact with STARS via a client application installed on the user device(s) and/or a web interface. This allows users to define parameters according to which the IoT-enabled SMM device(s) are to operate. By using a spatial mapping technology, the IoT-enabled SMM device(s) can map a space to determine an initial volume capacity (i.e., a volume of a monitored space that is unoccupied by one or more items), and over time, can perform ongoing volume monitoring of the space to determine an occupancy of the space. The occupancy indicates a volume of the space that is occupied by one or more items.

It should be appreciated that the above-described subject matter may be implemented as a computer-controlled apparatus, a computer process, a computing system, or as an article of manufacture such as a computer-readable storage medium. These and various other features will be apparent from a reading of the remaining Detailed Description and a review of the associated drawings.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system configurations, including hand-held devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a spatial telemeter alert reconnaissance system will be described.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 includes a spatial telemeter alert reconnaissance system ("STARS") 102. The STARS 102 enables IoT device-based spatial mapping and monitoring services. The spatial mapping and monitoring services provided by the STARS 102 are adaptable for a variety of use cases, some examples of which include, but are not limited to, home automation, small business inventory management, and large scale warehouse inventory management. Those skilled in the art will appreciate the applicability of the concepts and technologies disclosed herein to other use cases, and as such, the example use cases described herein should not be construed as being limiting in any way.

The STARS 102 enables spatial mapping and monitoring of one or more items 104 located within one or more spaces 106 monitored ("monitored space") by one or more IoT-enabled spatial mapping and monitoring ("SMM") devices 108 deployed within the monitored space 106. The items 104 can be any physical item that a user 110, group of users, business, service provider, or any other entity (referred to herein generically as "user" 110) wants to monitor within a given space, such as the monitored space 106. The monitored space 106 can be any space that has a capacity sufficient to enclose, at least partially, at least one of the items 104. By way of example, and not limitation, the monitored space 106 can be a building or some portion thereof, a home or some portion thereof, a container of any kind, a mailbox, an interior of an appliance (e.g., refrigerator, dishwasher, oven, clothes washing machine, clothes dryer, etc.), or the like.

The SMM device(s) 108 can be any device capable of performing spatial mapping and monitoring operations described herein. Moreover, the SMM device(s) 108 can be configured to operate in accordance with any spatial mapping technology or combination of spatial mapping technologies. Some example spatial mapping technologies include, but are not limited to, electromagnetic-based technologies such as infrared and laser, camera-based technologies, sound-based technologies such as echolocation, combinations thereof, and the like. Those skilled in the art will appreciate the applicability of the concepts and technologies disclosed herein to other spatial mapping technologies, and as such, the concepts and technologies disclosed herein should not be construed as being limiting in this regard.

The STARS 102 also includes a rules and integration system 112. The rules and integration system 112 can store one or more initial spatial maps 114 associated with the space(s) monitored by the SMM device(s) 108, such as the illustrated monitored space(s) 106. The initial spatial map(s) 114 can be taken by the SMM device 108 during a setup process to determine spatial characteristics of the monitored space 106, such as volume of the monitored space 106.

Initially, the SMM device 108 can measure the monitored space 106 and determine a maximum volume of the monitored space 106 (empty state) by classifying the monitored space 106 as some shape based upon which a volume calculation can be made. For example, the volume of a cuboid-type container could be calculated as Length×Width×Height. Those skilled in the art will appreciate the applicability of other volume formulas based upon the shape of the monitored space 106. In a scenario where the monitored space 106 is of an irregular shape, such as a cabinet with a box taking up some space in the corner, the SMM device 108 can recognize that perhaps dissecting that space into two rectangular cuboids would allow volume calculations to be made, and then combine the volume units for each rectangular cuboid to determine a maximum volume capacity. In the event that a first cuboid that created the irregular shape in the monitored space 106 is removed, the SMM device 108 can utilize an identifier attached thereto (e.g., as a QR code) that the STARS 102 can recognize as having left the monitored space 106 and thereby the volume now available. If the monitored space 106 contains only one type of item (e.g., a cabinet that contains only toilet paper), the SMM device 108 can be used to determine the volume of one of the items, and can recognize when that volume has left the monitored space 106 to determine an exact (or approximate) number of that type of item that left the monitored space 106.

The initial spatial map(s) 114 can take into account other objects located within the monitored space 106 that reduce the initial volume inside the monitored space 106 that could otherwise be used to enclose, at least partially, the item(s) 104. In some embodiments, other objects located in the monitored space 106 can be identified separate from the item(s) 104 to be monitored. In this manner, the SMM device(s) 108 can determine the item(s) 104 to be monitored versus other items that may be located in the monitored space 106. For example, if the user 110 desires to monitor a container of liquid (e.g., tea), the SMM device 108 can be attached to the inside of the container, such as to a lid of the container, and in this manner, the SMM device 108 can monitor the amount of liquid remaining in the container using the volume analysis concepts disclosed herein.

In some embodiments, the item(s) 104 can be associated with one or more identifiers such as a globally unique identifier, a serial number, a model number, a unique identifier, and/or other types of identifying information. The identifier can be associated with a visual indicia. The visual indicia can be embodied as a two-dimensional ("2D") bar-code such as a quick response code ("QR code"). According to some other embodiments, the visual indicia can include other types of 2D barcodes such as, for example, a MAXI- CODE, a DATA MATRIX, an EZCODE, an AZTEC code, a CODABLOCK barcode, and/or other matrix barcodes; various multicolor codes such as a HIGH CAPACITY COLOR BARCODE and/or a HUECODE; combinations thereof; or the like. Because the indicia can include almost any type of information for representing the identifier for an item 104, it should be understood that these embodiments are illustrative, and should not be construed as being limiting in any way.

The SMM device 108, in some embodiments, can scan the visual indicia (e.g., the QR code) for the item(s) 104 located within the monitored space 106 and can transmit the associated identifier to the STARS 102. The STARS 102 can determine when a particular item is missing by the SMM device 108 no longer being able to identify the associated identifier via the visual indicia.

The STARS 102 can, over time, request that the SMM device(s) 108 perform additional spatial mappings of the monitored space 106 to determine an occupancy of the monitored space 106—that is, a portion of monitored space 106 occupied by the item(s) 104. The occupancy of the monitored space 106 can be expressed in terms of a percentage, although other expressions can be used and are contemplated. These mappings can be stored by the rules and integration system 112 as updated spatial maps 116.

The rules and integration system 112 can compare the initial spatial map(s) 114 to the updated spatial map(s) 116 to determine occupancy changes within the monitored space 106. The rules and integration system 112 can perform operations based upon any occupancy changes in accordance with one or more rules 118. In some embodiments, the rules 118 can include one or more rules that specify one or more if-then conditions by which to handle a particular situation. In some other embodiments, the rules 118 can include one or more matrices of cause and effect conditions, tables of actions, or the like for responding to or otherwise dealing with certain stimuli. The rule(s) 118, in some embodiments, can be defined by the user 110. The user 110 and his/her rule(s) 118 can be associated with a user account 120, which can also identify the monitored space(s) 106, the SMM device(s) 108, the item(s) 104, and other information, such as information identifying the user 110.

The user 110 can be associated with a user device 122. According to various embodiments, the functionality of the user device 122 may be provided by one or more server computers, desktop computers, mobile telephones, laptop computers, set-top boxes, other computing systems, and the like. It should be understood that the functionality of the user device 122 can be provided by a single device, by two similar devices, and/or by two or more dissimilar devices. For purposes of describing the concepts and technologies disclosed herein, the user device 122 is described herein as a personal computer or a mobile device such as a cellular smartphone. It should be understood that these embodiments are illustrative, and should not be construed as being limiting in any way.

The illustrated user device 122 can execute a STARS device application 124 to interact with the STARS 102. The STARS device application 124 can be a native application. Alternatively, the STARS device application 124 can be a web application accessible via a web browser application (not shown). Other embodiments of the STARS device application 124 include functionality built-in to an operating system of the user device 122 (best shown in FIG. 8). By way of example, and not limitation, the STARS device application 124 can allow the user 110 to communicate with the rules and integration system 112 to establish the initial spatial map 114 of the monitored space 106, to create the updated spatial map(s) 116, to define/update the rule(s) 118, to set up and update the user account 120, and to otherwise interact with the STARS 102 and the components thereof.

The user device 122 and the STARS 102 can be in communication via a network 126. The network 126 can be implemented in accordance with any wired or wireless network technology. The network 126 can facilitate communications between the STARS 102 and the user device 122. The network 126 can facilitate communications between the user device 122 and one or more third party services 128. The network 126 can facilitate communications between STARS 102 and the third party service(s) 128. Additional details about the network 126 can be found herein below with reference to FIG. 9.

The third party service(s) 128 can include any consumer and/or business-oriented services. The third party service(s) 128 can be industry-specific. For example, the third party service(s) 128 can provide services in the automotive, energy, healthcare, industrial, retail, smart buildings/homes industries, and/or the like. Those skilled in the art will appreciate the applicability of the third party service(s) 128 to other industries. For this reason, third party service(s) 128 described herein are used merely to illustrate some examples, and therefore should not be construed as being limiting in any way.

In some embodiments, the rules and integration system 112 can interact with the third party services 128 in accordance with the rule(s) 118 to cause the third party service(s) 128 to perform one or more tasks. By way of example, and not limitation, the third party service 128 can include a supplier service that supplies one or more of the items 104 located with the monitored space 106. When the updated spatial map 116 of the monitored space 106 indicates an occupancy that falls below an occupancy threshold, the rule 118 can cause the rules and integration system 112 to place an order with the third party service 128 for one or more of the items 104 to increase the occupancy to above the occupancy threshold. In this manner, the STARS 102 can coordinate with the third party service(s) 128 for inventory management of the monitored space 106.

For monitoring the item(s) 104 in the monitored space 106, the user 110 can be provided with an option to scan the visual indicia (e.g., a QR code or the like mentioned above) of the item 104 to the STARS 102 so that when the item 104 is missing from the monitored space 106, the STARS 102 can perform one or more tasks defined by the user 110. Additionally, the SMM device 108 can be definable in such a way that the user 110 can choose to monitor only a set portion of the monitored space 106.

It should be understood that some implementations of the operating environment 100 can include multiple STARS 102, multiple monitored spaces 106, multiple SMM devices 108, multiple users 110, multiple rules and integration systems 112, multiple user devices 122, multiple STARS device applications 124, multiple networks 126, or some combination thereof. Thus, the illustrated embodiment should be understood as being illustrative, and should not be construed as being limiting in any way.

Figure 2:
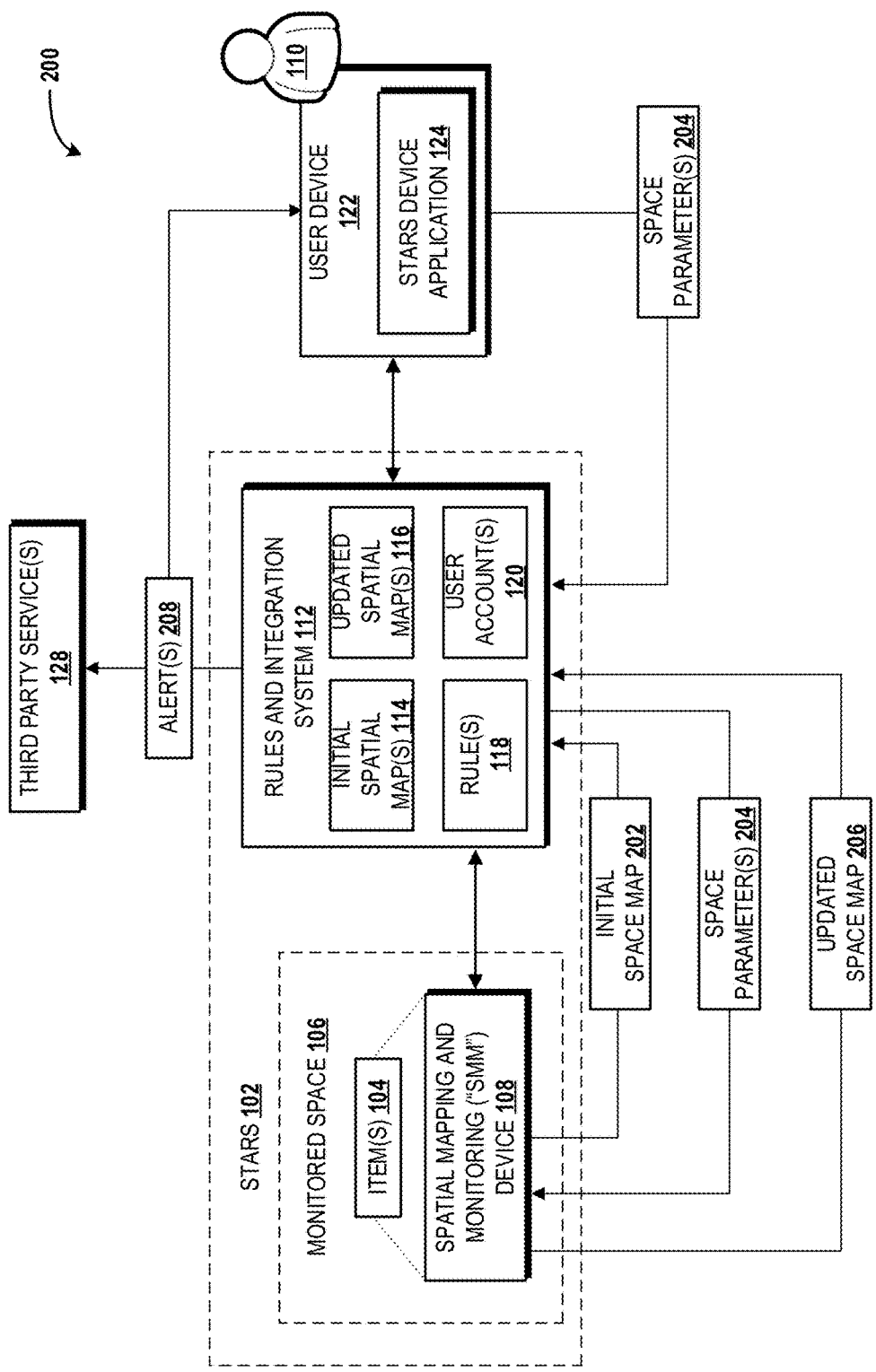
FIG. 2 is a block diagram illustrating aspects of a setup workflow for a spatial telemeter alert reconnaissance system ("STARS"), according to an illustrative embodiment.

Turning now to FIG. 2, a block diagram illustrating additional aspects (generally shown at 200) of the STARS 102, the SMM device 108, the user device 122, and the rules and integration system 112 capable of implementing the embodiments presented herein will be described. Prior to using the STARS 102, the user 110 (or another entity on behalf of the user 110) deploys the SMM device 108 within a space that is to be monitored, such as the monitored space 106 in the illustrated example. After deployment, the SMM device 108 is synchronized with the rules and integration system 112. This synchronization process can include registering the SMM device 108 in association with the monitored space 106 and the user 110 in a corresponding one of the user accounts 120.

After synchronization, the SMM device 108 can perform an initial spatial mapping of the monitored space 106 to create an initial space map 202. The initial space map 202 can include a volume capacity of the monitored space 106 prior to any of the items 104 being deployed therein. The SMM device 108 provides the initial space map 202 to the rules and integration system 112. The rules and integration system 112 stores the initial space map 202 as one of the initial spatial maps 114 in association with the user account 120.

The user 110 can enable monitoring and mapping of the monitored space 106 by the SMM device 108 via the STARS device application 124 executing on the user device 122. In particular, the STARS device application 124 can present a user interface (not shown) through which the user 110 can define one or more space parameters 204. The space parameter(s) 204 can include parameters associated with the monitored space 106. In addition, the space parameter(s) 204 can be utilized by the SMM device 108 to perform the mapping and monitoring operations described herein. The space parameter(s) 204 also can be utilized by the rules and integration system 112 to perform operations described herein in accordance with the rule(s) 118.

The space parameter(s) 204 can include a mapping frequency that is utilized by the SMM device 108 to perform spatial mapping of the monitored space 106 at a specified frequency, such as every minute, hour, day, or some other interval of time. The SMM device 108 can receive the mapping frequency from the STARS 102 and can map the monitored space 106 to create an updated space map 206 in accordance with the mapping frequency. The updated space map 206 can include an updated volume capacity of the monitored space 106 indicative of a change in the items 104 located within the monitored space 106. The SMM device 108 provides the updated space map 206 to the rules and integration system 112. The rules and integration system 112 stores the updated space map 206 as one of the updated spatial maps 116 in association with the user account 120.

The space parameter(s) 204 can include an occupancy threshold for the monitored space 106. The occupancy threshold can specify a value for an occupied volume of the monitored space 106 that, when met, is utilized by the rules and integration system 112 to perform one or more operations based upon the rule(s) 118. The operations can include, for example, generating one or more alerts 208 directed to the third party service(s) 128 and/or to the user device 122. In response to the alert(s) 208, the third party service(s) 128 and/or the user device 122 can perform one or more tasks. For example, the third party service 128 can include a supplier service that supplies one or more of the items 104 located with the monitored space 106. When the updated spatial map 116 of the monitored space 106 indicates an occupancy that falls below an occupancy threshold, a rule 118 can cause the rules and integration system 112 to place an order with the third party service 128 for one or more of the items 104 to increase the occupancy to above the occupancy threshold. In this manner, the STARS 102 can coordinate with the third party service(s) 128 for inventory management of the monitored space 106.

After the SMM device 108 maps the monitored space 106 and sends the updated space map 206 to the rules and integration system 112, the rules and integration system 112 uses the updated spatial map(s) 116, the initial spatial map(s) 114, and the rules 118 to determine whether or not an alert 208 should be triggered. In this manner, the user 110, or another entity on behalf of the user 110, can create automated events triggered by the occupancy of the item(s) within the monitored space 106.

Figure 3:
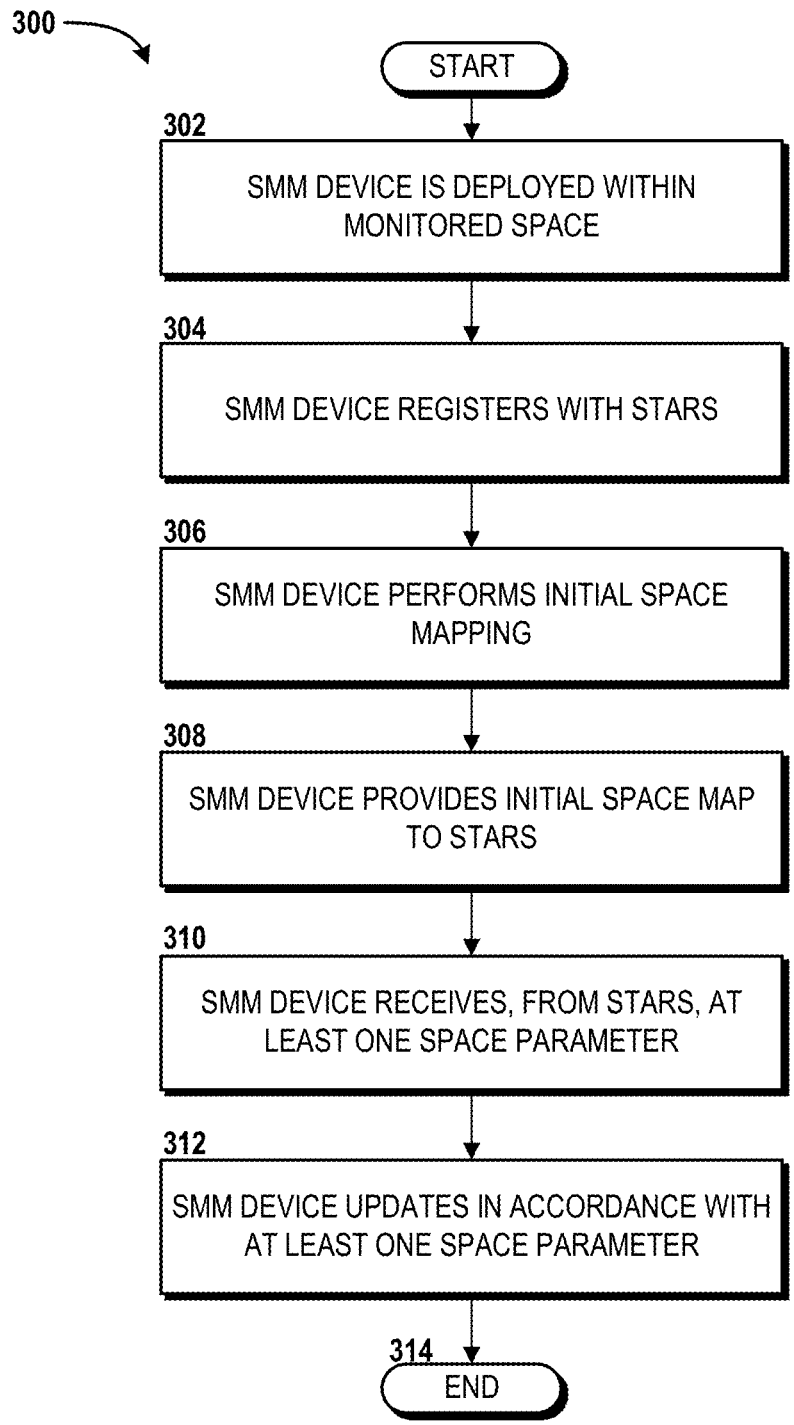
FIG. 3 is a flow diagram illustrating aspects of a method for setting up a spatial mapping and monitoring ("SMM") device for a space monitored by the STARS, according to an illustrative embodiment.

Turning now to FIG. 3, a flow diagram illustrating aspects of a method 300 for setting up the SMM device 108 to monitor the monitored space 106 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of the STARS 102, the SMM device 108, the rules and integration system 112, the user device 122, and/or one or more other computing systems and/or devices disclosed herein to perform operations.

For purposes of illustrating and describing some of the concepts of the present disclosure, the methods disclosed herein are described as being performed, at least in part, by the STARS 102, the SMM device 108, the rules and integration system 112, and/or the user device 122 via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 begins and proceeds to operation 302, wherein the SMM device 108 is deployed within the monitored space 106. From operation 302, the method 300 proceeds to operation 304, where the SMM device 108 registers with the STARS 102 via the rules and integration system 112. The SMM device 108 can provide a device identifier that uniquely identifies the SMM device 108 to the STARS 102. The device identifier can be stored by the rules and integration system 112 in association with an identifier of the monitored space 106 and the user 110 in a corresponding one of the user accounts 120.

From operation 304, the method 300 proceeds to operation 306, where the SMM device 108 performs an initial spatial mapping of the monitored space 106 to create the initial space map 202. As noted above, the initial space map 202 can include a volume capacity of the monitored space 106 prior to any of the items 104 being deployed therein. From operation 306, the method 300 proceeds to operation 308, where the SMM device 108 provides the initial space map 202 to the STARS 102. The rules and integration system 112 stores the initial space map 202 as one of the initial spatial maps 114 in association with the user account 120.

From operation 308, the method 300 proceeds to operation 310, where the SMM device 108 receives, from the STARS 102, at least one space parameter 204. From operation 310, the method 300 proceeds to operation 312, where the SMM device 108 updates in accordance with the at least one space parameter 204. As noted above, the space parameter(s) 204 can include a mapping frequency that is utilized by the SMM device 108 to perform spatial mapping of the monitored space 106 at a specified frequency, such as every minute, hour, day, or some other interval of time. The SMM device 108 can receive the mapping frequency from the STARS 102 and can map the monitored space 106 to create an updated space map 206 in accordance with the mapping frequency. The updated space map 206 can include an updated volume capacity of the monitored space 106 indicative of a change in the items 104 located within the monitored space 106. The space parameter(s) 204 also can include an occupancy threshold for the monitored space 106. The occupancy threshold can specify a value for an occupied volume of the monitored space 106 that, when met, is utilized by the rules and integration system 112 to perform one or more operations based upon the rule(s) 118. The operations can include, for example, generating one or more alerts 208 directed to the third party service(s) 128 and/or to the user device 122. In response to the alert(s) 208, the third party service(s) 128 and/or the user device 122 can perform one or more tasks. For example, the third party service 128 can include a supplier service that supplies one or more of the items 104 located within the monitored space 106. When the updated spatial map 116 of the monitored space 106 indicates an occupancy that falls below an occupancy threshold, a rule 118 can cause the rules and integration system 112 to place an order with the third party service 128 for one or more of the items 104 to increase the occupancy to above the occupancy threshold. In this manner, the STARS 102 can coordinate with the third party service(s) 128 for inventory management of the monitored space 106.

From operation 312, the method 300 proceeds to operation 314. The method 300 ends at operation 314.

Figure 4:
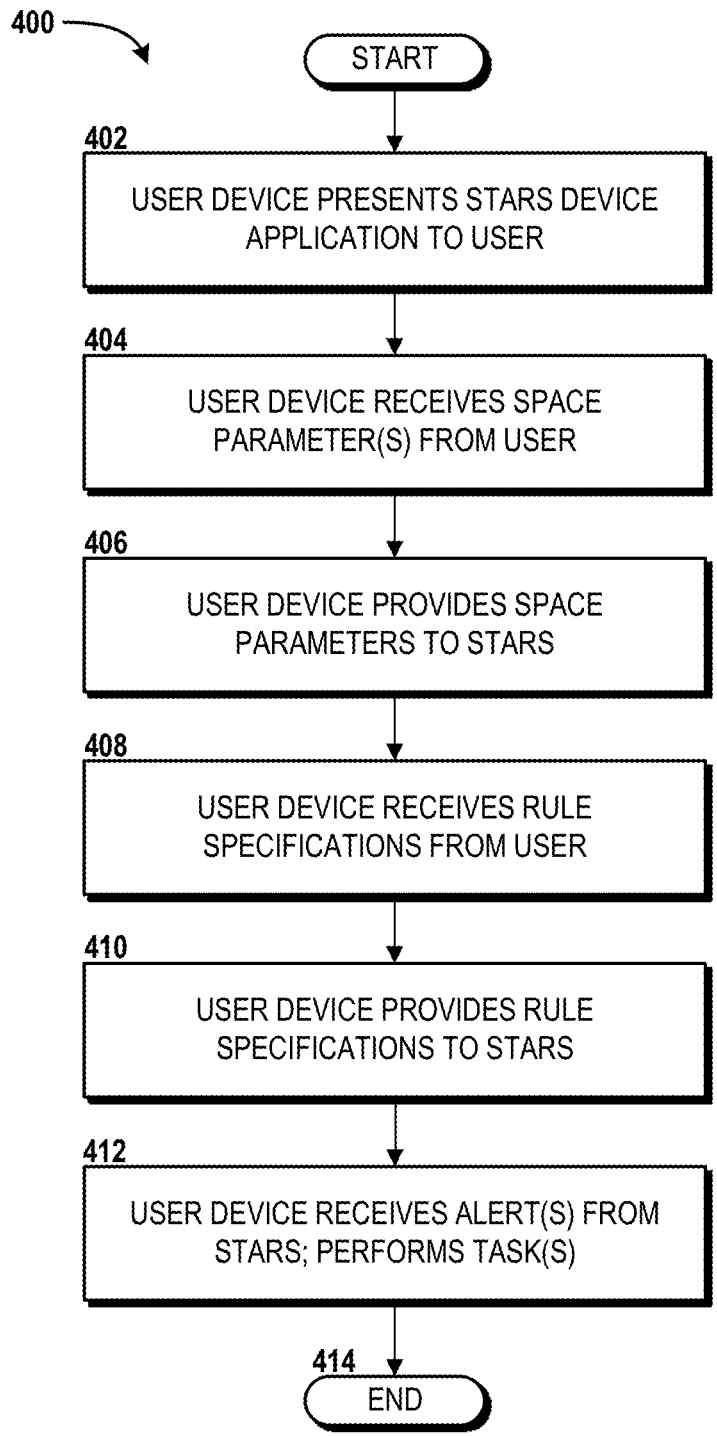
FIG. 4 is a block diagram illustrating aspects of a method for operating a user device, according to an illustrative embodiment.

Turning now to FIG. 4, a flow diagram illustrating aspects of a method 400 for operating the user device 122 will be described, according to an illustrative embodiment. The method 400 begins and proceeds to operation 402, where the user device 122 presents the STARS device application 124 to the user 110. From operation 402, the method 400 proceeds to operation 404, where the user device 122 receives at least one space parameter 204 from the user 110. In response, at operation 406, the user device 122 provides the space parameter(s) 204 to the STARS 102.

From operation 406, the method 400 proceeds to operation 408, where the user device 122 receives, from the user 110, rule specifications for one or more of the rules 118 to be implemented by the rules and integration system 112. From operation 408, the method 400 proceeds to operation 410, where the user device 112 provides the rule specifications to the STARS 102. The STARS 102 can implement the rules 118 to generate one or more of the alerts 208 directed to the user device 122. From operation 410, the method 400 proceeds to operation 412, where the user device 122 receives the alert(s) 208 from the STARS 102 and performs one or more tasks in response thereto.

From operation 412, the method 400 proceeds to operation 414. The method 400 ends at operation 414.

Figure 5:
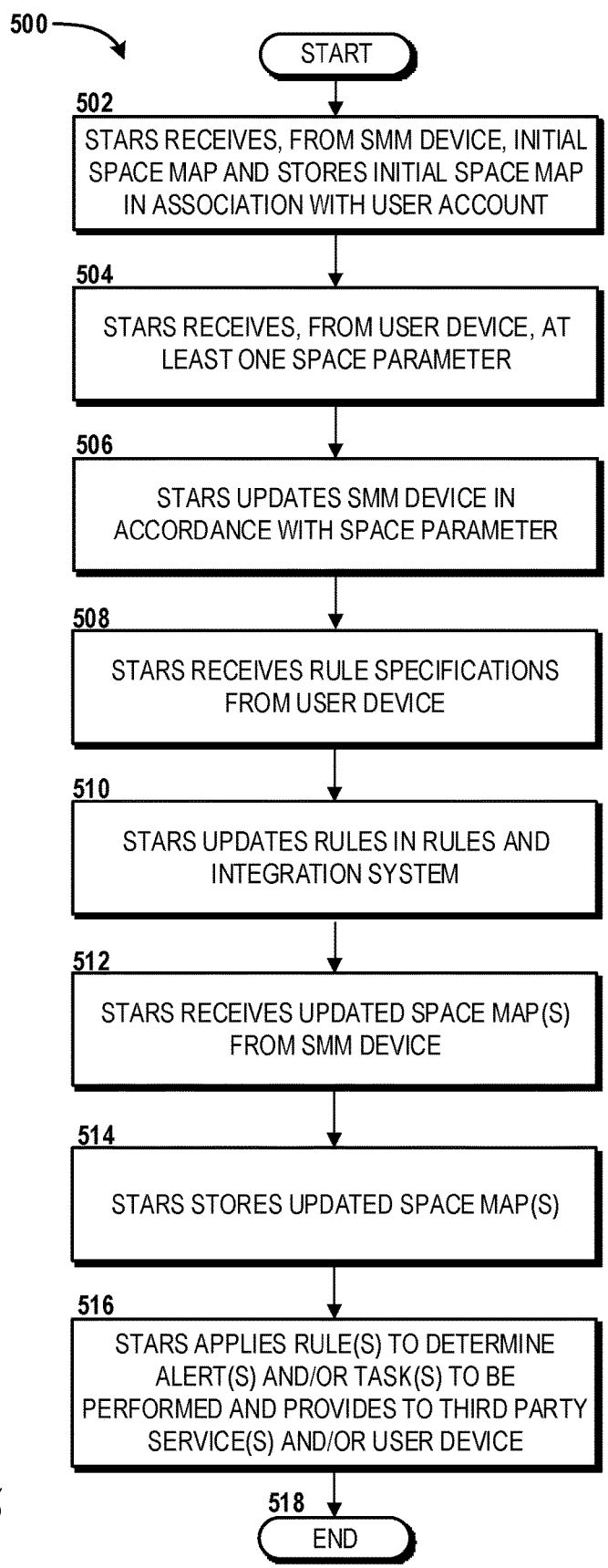
FIG. 5 is a flow diagram illustrating aspects of a method for operating the STARS, according to an illustrative embodiment.

Turning now to FIG. 5, a flow diagram illustrating aspects of a method 500 for operating the STARS 102 will be described, according to an illustrative embodiment. The method 500 begins and proceeds to operation 502, where the STARS 102 receives, from the SMM device 108, the initial space map 202 from the SMM device 108. The STARS 102 then stores the initial space map 202 as part of the initial space map(s) 114 associated with the user account 120 to which the SMM device 108 is assigned and in association with the user 110. From operation 502, the method 500 proceeds to operation 504, where the STARS 102 receives, from the user device 122, the space parameter(s) 204. The STARS 102 then, at operation 506, updates SMM device 108 with the space parameter(s) 204. In this manner, the SMM device 108 will then operate in accordance with the space parameter(s) 204 to provide the updated space map(s) 206 to the STARS 102.

From operation 506, the method 500 proceeds to operation 508, where the STARS 102 receives, from the user device 122, rule specifications. From operation 508, the method 500 proceeds to operation 510, where the STARS 102 updates the rules 118 in accordance with the rule specifications. In addition or alternatively, the STARS 102 can create one or more new rules 118 in accordance with the rule specifications.

From operation 510, the method 500 proceeds to operation 512, where the STARS 102 receives the updated space map(s) 206 from the SMM device 108. The STARS 102, at operation 514, stores the updated space map(s) 206. From operation 514, the method 500 proceeds to operation 516, where the STARS 102 applies the rule(s) 118 to determine the alert(s) 208 and/or any tasks to be performed by the third party service(s) 128 and or the user device 122 in accordance with the rule(s) 118. The STARS 102 then provides the alert(s) 208 and/or task(s) to the third party service(s) 128 and/or the user device 122.

From operation 516, the method 500 proceeds to operation 518. The method 500 ends at operation 518.

Figure 6:
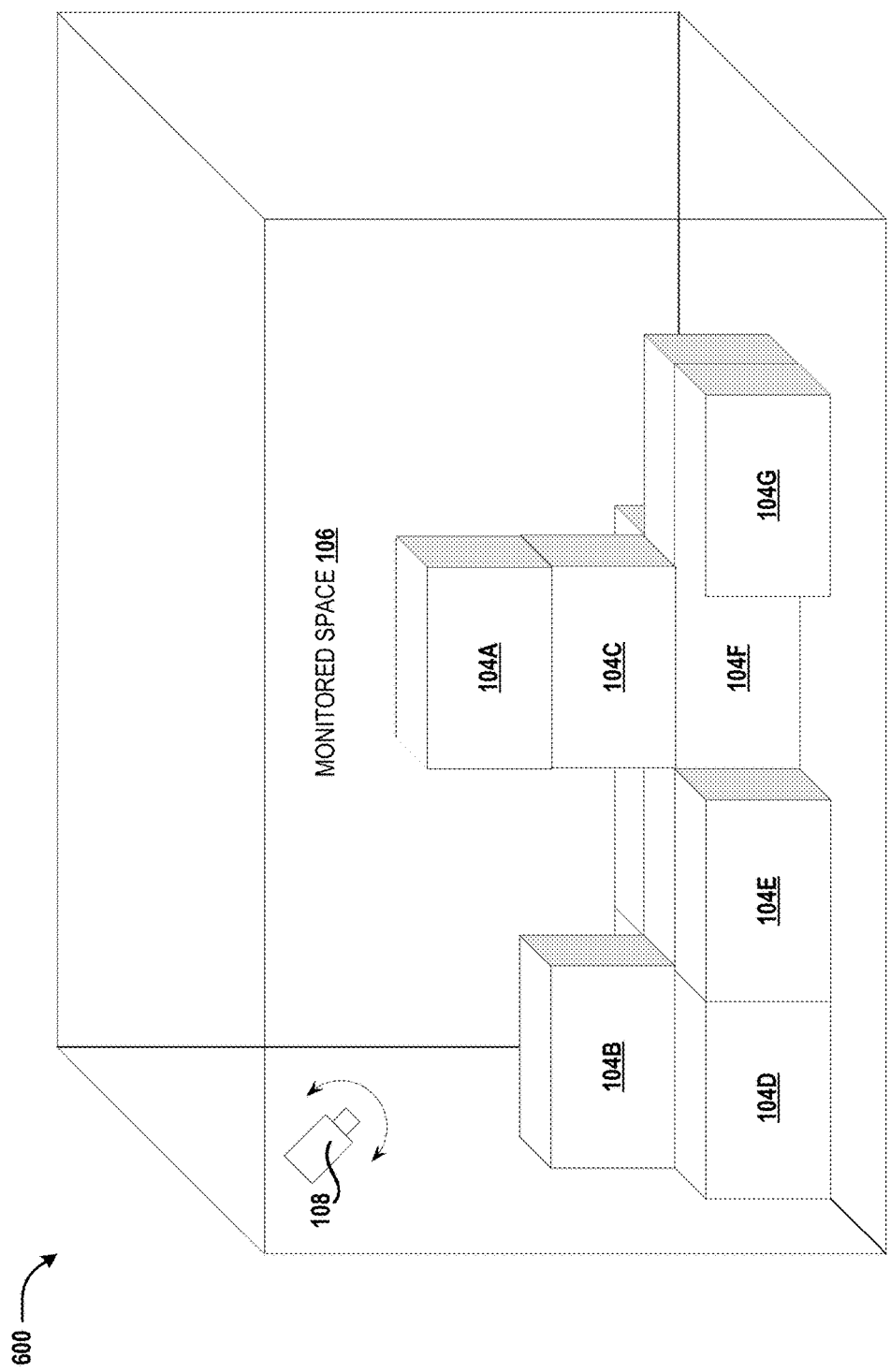
FIG. 6 is a 3-D representation of a space monitored by the STARS, according to an illustrative embodiment.

Turning now to FIG. 6, a 3-D representation 600 of the space 106 monitored by the SMM device 108 will be described, according to an illustrative embodiment. The illustrated 3-D representation 600 includes items 104A-104G located within the monitored space 106. As noted above, the SMM device 108 can perform additional spatial mappings of the monitored space 106 to determine an occupancy of the monitored space 106—that is, a portion of the monitored space 106 occupied by the item(s) 104. As additional item(s) 104 are added to or taken away from the monitored space 106, the SMM device 108 can create the updated space map(s) 206 and send the updated space map(s) 206 to the STARS 102 and, in particular, the rules and integration system 112, which can apply the rule(s) 118 as described above and provide the alert(s) 208 and/or task(s) to the third party service(s) 128 and/or the user device 122. It should be understood that the 3-D representation 600 is provided merely for purposes of illustration and should not be construed as limiting the spatial characteristics of the monitored space 106, the implementation of the SMM device 108 as a camera-based device, the number of items 104 located within the monitored space 106, or in any other way.

Figure 7:
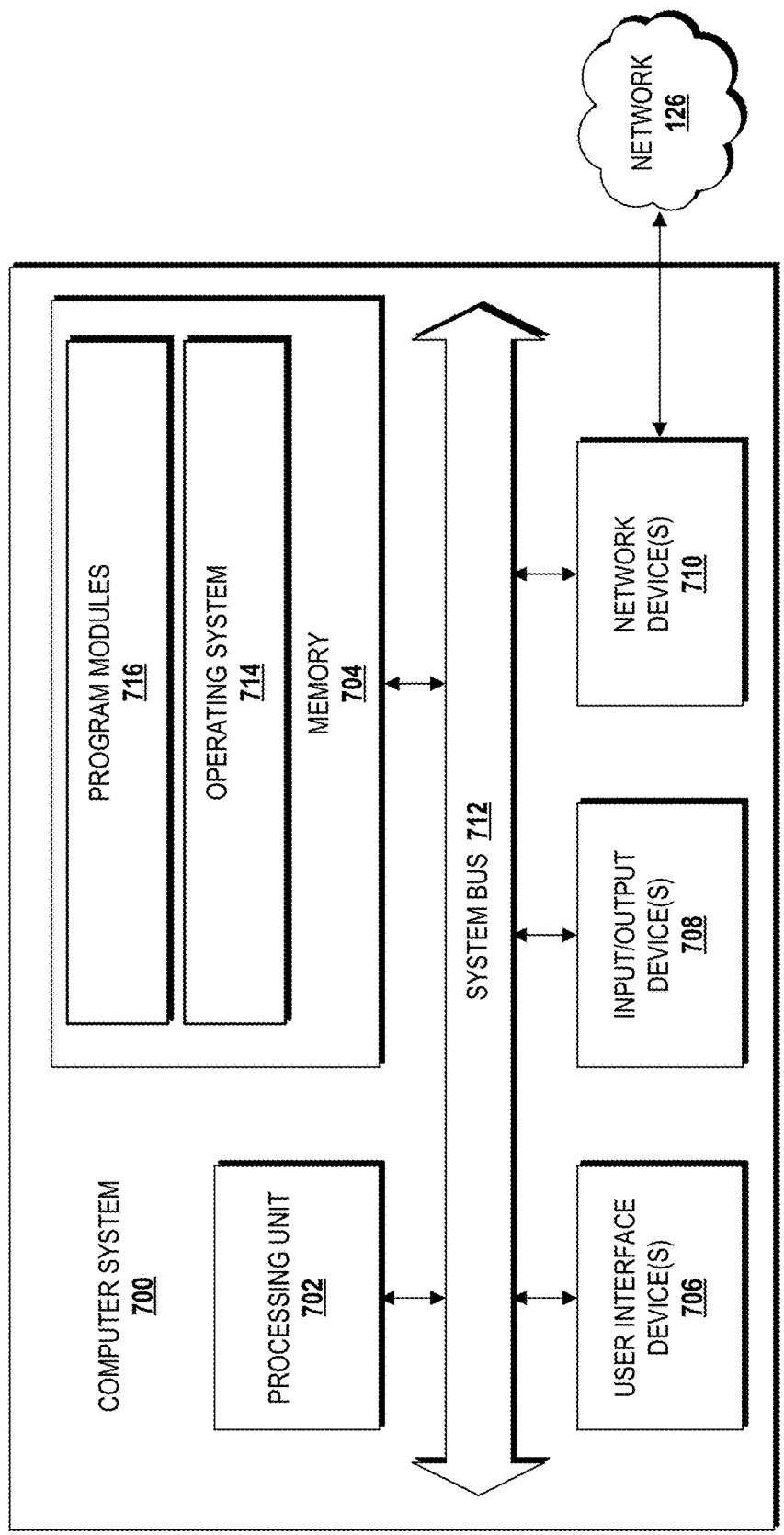
FIG. 7 is a block diagram illustrating an example computer system capable of implementing aspects of the embodiments presented herein.

Turning now to FIG. 7, a block diagram illustrating a computer system 700 configured to perform various operations disclosed herein. The computer system 700 includes a processing unit 702, a memory 704, one or more user interface devices 706, one or more input/output ("I/O") devices 708, and one or more network devices 710, each of which is operatively connected to a system bus 712. The system bus 712 enables bi-directional communication between the processing unit 702, the memory 704, the user interface devices 706, the I/O devices 708, and the network devices 710. In some embodiments, the STARS 102, the rules and integration system 112, the user device 122, one or more systems associated with the network 126, one or more systems associated with the third party service(s) 128, other systems disclosed or implied herein, or some combination thereof is/are configured, at least in part, like the computer system 700. It should be understood, however, that these systems may include additional functionality or include less functionality than now described.

The processing unit 702 may be a standard central processor that performs arithmetic and logical operations, a more specific purpose programmable logic controller ("PLC"), a programmable gate array, or other type of processor known to those skilled in the art and suitable for controlling the operation of the computer system 700. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The illustrated memory 704 includes an operating system 714 and one or more program modules 716.

The operating system 714 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The program modules 716 may include various software and/or program modules described herein. These and/or other programs can be embodied in computer-readable media containing instructions that, when executed by the processing unit 702, perform one or more operations and/or other functionality as illustrated and described herein. It can be appreciated that, at least by virtue of the instructions embodying, for example, the methods and/or other functionality illustrated and described herein being stored in the memory 704 and/or accessed and/or executed by the processing unit 702, the computer system 700 is a special-purpose computing system that can facilitate providing the functionality illustrated and described herein. According to embodiments, the program modules 716 may be embodied in hardware, software, firmware, or any combination thereof. Although not shown in FIG. 7, it should be understood that the memory 704 also can be configured to store any data described herein, if desired.

The user interface devices 706 may include one or more devices with which a user accesses the computer system 700. The user interface devices 706 may include, but are not limited to, computers, servers, personal digital assistants, telephones (e.g., cellular, IP, or landline), or any suitable computing devices. The I/O devices 708 enable a user to interface with the program modules. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, a touchscreen, or an electronic stylus. Further, the I/O devices 708 may include one or more output devices, such as, but not limited to, a display screen or a printer.

The network devices 710 enable the computer system 700 to communicate with other networks or remote systems via the network 126. Examples of the network devices 710 include, but are not limited to, a modem, a radio frequency ("RF") or infrared ("IR") transceiver, a telephonic interface, a bridge, a router, or a network card. The network 126 may include a wireless network such as, but not limited to, a wireless local area network ("WLAN") such as a WI-FI network, a wireless wide area network ("WWAN"), a wireless PAN ("WPAN") such as BLUETOOTH, or a wireless metropolitan area network ("WMAN"). Alternatively, the network 126 may be a wired network such as, but not limited to, a WAN such as the Internet, a LAN such as the Ethernet, a wired PAN, or a wired MAN.

Figure 8:
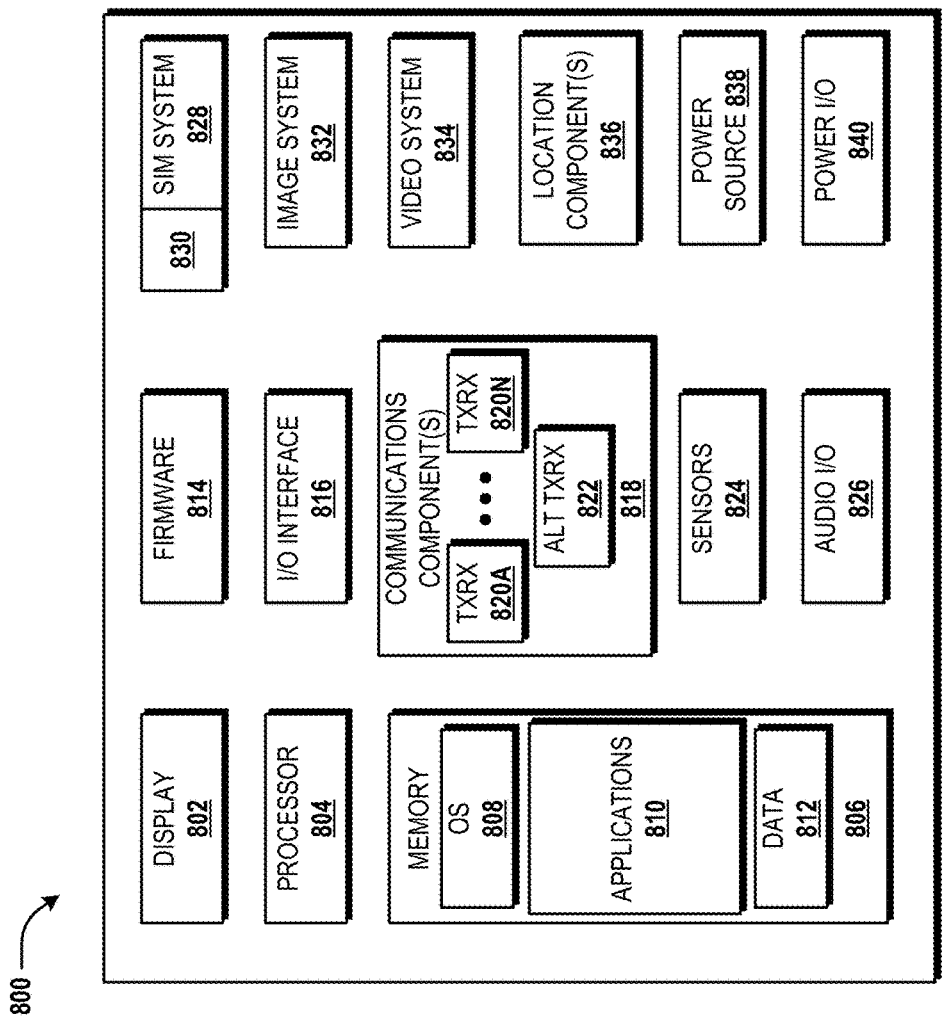
FIG. 8 is a block diagram illustrating an example mobile device capable of implementing aspects of the embodiments disclosed herein.

Turning now to FIG. 8, an illustrative mobile device 800 and components thereof will be described. In some embodiments, the user device 122 described above and/or other devices described herein can be configured as and/or can have an architecture similar or identical to the mobile device 800 described herein in FIG. 8. It should be understood, however, that devices described or implied herein may or may not include the functionality described herein with reference to FIG. 8. While connections are not shown between the various components illustrated in FIG. 8, it should be understood that some, none, or all of the components illustrated in FIG. 8 can be configured to interact with one another to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display network connection information, various graphical user interface ("GUI") elements, text, images, video, virtual keypads and/or keyboards, messaging data, notification messages, metadata, Internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810, other computer-executable instructions stored in the memory 806, or the like. In some embodiments, the applications 810 also can include a UI application (not illustrated in FIG. 8).

The UI application can interface with the operating system 808 to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in data communications, entering/deleting data, entering and setting user IDs and passwords for device access, configuring settings, manipulating content and/or settings, multimode interaction, interacting with other applications 810, and otherwise facilitating user interaction with the operating system 808, the applications 810, and/or other types or instances of data 812 that can be stored at the mobile device 800.

The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

It can be appreciated that, at least by virtue of storage of the instructions corresponding to the applications 810 and/or other instructions embodying other functionality illustrated and described herein in the memory 806, and/or by virtue of the instructions corresponding to the applications 810 and/or other instructions embodying other functionality illustrated and described herein being accessed and/or executed by the processor 804, the mobile device 800 is a special-purpose mobile device that can facilitate providing the functionality illustrated and described herein. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as a WWAN WI-FI access network and/or the WWAN cellular access network described herein. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments, one or more of the transceivers of the communications component 818 may be configured to communicate using Global System for Mobile communications ("GSM"), Code Division Multiple Access One ("CDMAONE"), CDMA2000, Long-Term Evolution ("LTE"), LTE Advanced, and various other 2G, 2.5G, 3G, 4G, 4.5G, 5G and greater generation technology standards. Moreover, the communications component 818 may facilitate communications over various channel access methods (which may or may not be used by the aforementioned standards) including, but not limited to, Time Division Multiple Access ("TDMA"), Frequency Division Multiple Access ("FDMA"), Wideband CDMA ("W-CDMA"), Orthogonal Frequency Division Multiple Access ("OFDMA"), Space Division Multiple Access ("SDMA"), and the like.

In addition, the communications component 818 may facilitate data communications using General Packet Radio Service ("GPRS"), Enhanced Data rates for GSM Evolution ("EDGE"), the High-Speed Packet Access ("HSPA") protocol family including High-Speed Downlink Packet Access ("HSDPA"), Enhanced Upload Link ("EUL") or otherwise termed High-Speed Uplink Packet Access ("HSUPA"), HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-820N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from GPS devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 800 or other devices or computers described herein, such as the computer system 800 described above with reference to FIG. 8. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 800 in order to store and execute the software components presented herein. It is also contemplated that the mobile device 800 may not include all of the components shown in FIG. 8, may include other components that are not explicitly shown in FIG. 8, or may utilize an architecture completely different than that shown in FIG. 8.

Figure 9:
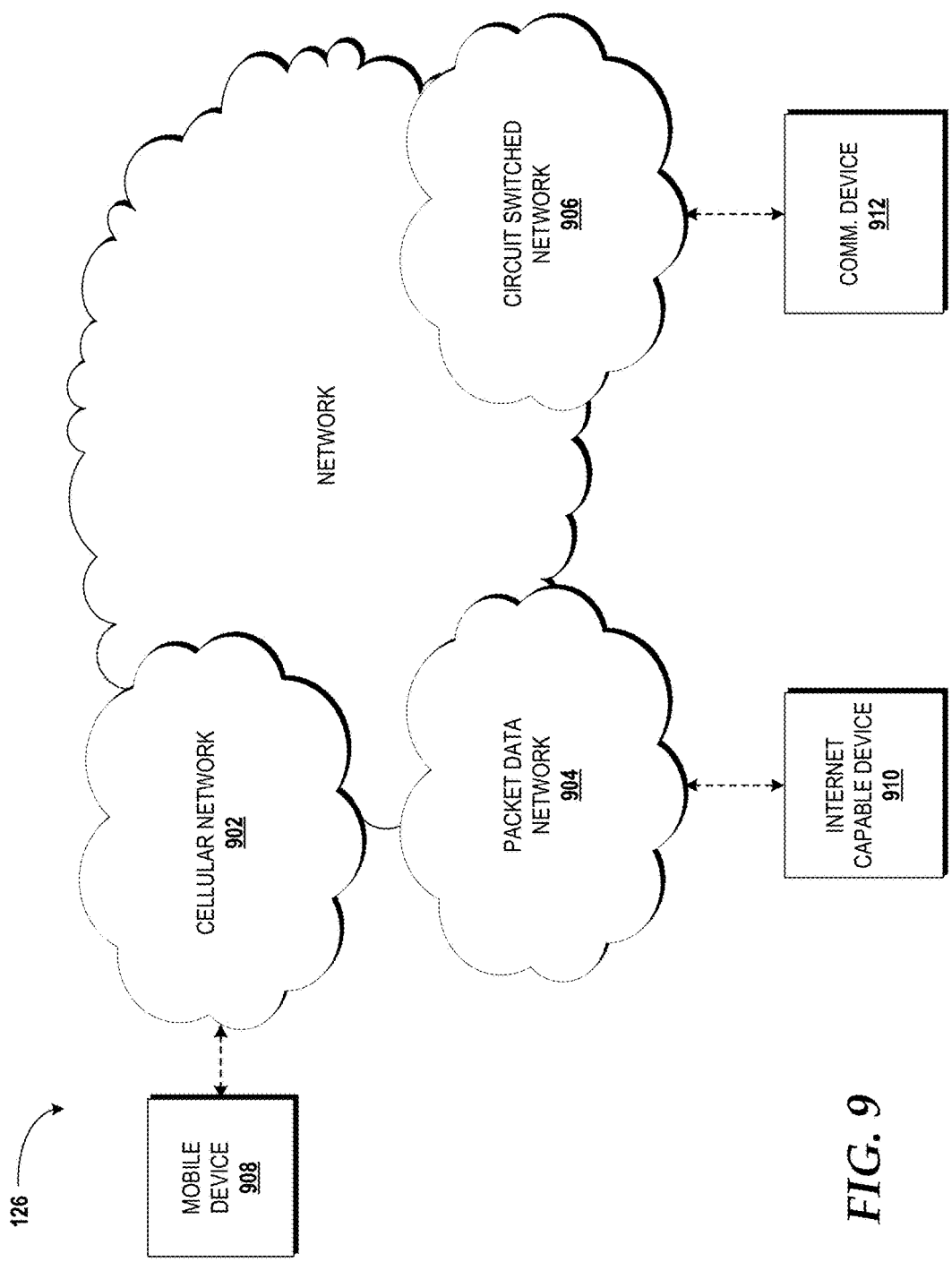
FIG. 9 is a diagram illustrating a network, according to an illustrative embodiment.

Turning now to FIG. 9, additional details of the network 126 are illustrated, according to an illustrative embodiment. The network 126 includes a cellular network 902, a packet data network 904, for example, the Internet, and a circuit switched network 906, for example, a publicly switched telephone network ("PSTN"). The cellular network 902 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 902 also includes radios and nodes for receiving and transmitting voice, data, and combinations thereof to and from radio transceivers, networks, the packet data network 904, and the circuit switched network 906.

A mobile communications device 908, such as, for example, a cellular telephone, a user equipment, a mobile terminal, a PDA, a laptop computer, a handheld computer, the user device 122, and combinations thereof, can be operatively connected to a cellular network. The cellular network 902 can be configured as a 2G Global System for Mobile communications ("GSM") network and can provide data communications via General Packet Radio Service ("GPRS") and/or Enhanced Data rates for GSM Evolution ("EDGE"). Additionally, or alternatively, the cellular network 902 can be configured as a 3G Universal Mobile Telecommunications System ("UMTS") network and can provide data communications via the High-Speed Packet Access ("HSPA") protocol family, for example, High-Speed Downlink Packet Access ("HSDPA"), Enhanced UpLink ("EUL") (also referred to as High-Speed Uplink Packet Access ("HSUPA")), and HSPA+. The cellular network 902 also is compatible with 4G mobile communications standards such as Long-Term Evolution ("LTE"), or the like, as well as evolved and future mobile standards.

The packet data network 904 includes various devices, for example, servers, computers, databases, and other devices in communication with one another, as is generally known. The packet data network 904 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 904 includes or is in communication with the Internet. The circuit switched network 906 includes various hardware and software for providing circuit switched communications. The circuit switched network 906 may include, or may be, what is often referred to as a plain old telephone system ("POTS"). The functionality of a circuit switched network 906 or other circuit-switched network are generally known and will not be described herein in detail.

The illustrated cellular network 902 is shown in communication with the packet data network 904 and a circuit switched network 906, though it should be appreciated that this is not necessarily the case. One or more Internet-capable devices 910, for example, a PC, a laptop, a portable device, or another suitable device, can communicate with one or more cellular networks 902, and devices connected thereto, through the packet data network 904. It also should be appreciated that the Internet-capable device 910 can communicate with a packet data network 904 through the circuit switched network 906, the cellular network 902, and/or via other networks (not illustrated).

As illustrated, a communications device 912, for example, a telephone, facsimile machine, modem, computer, or the like, can be in communication with the circuit switched network 906, and therethrough to the packet data network 904 and/or the cellular network 902. It should be appreciated that the communications device 912 can be an Internet-capable device, and can be substantially similar to the Internet-capable device 910. In the specification, the network 900 is used to refer broadly to any combination of the networks 902, 904, 906. It should be appreciated that substantially all of the functionality described with reference to the network 900 can be performed by the cellular network 902, the packet data network 904, and/or the circuit switched network 906, alone or in combination with other networks, network elements, and the like.

Based on the foregoing, it should be appreciated that concepts and technologies for a spatial telemeter alert reconnaissance system has been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

What is claimed is:

1. A spatial telemeter alert reconnaissance system comprising:
   a processor; and
   a memory that stores instructions that, when executed by the processor, cause the processor to perform operations comprising
      receiving, from a spatial mapping and monitoring device that is deployed within a space, an initial space map for the space, wherein the initial space map comprises a volume capacity of the space measured by the spatial mapping and monitoring device, and wherein the volume capacity of the space comprises a volume of the space unoccupied by an item,
      receiving, from the spatial mapping and monitoring device, a first updated space map for the space, wherein the first updated space map comprises a first updated volume capacity of the space measured by the spatial mapping and monitoring device,
      determining, based at least in part on the volume capacity of the space and the first updated volume capacity of the space, a first occupied volume of the space, wherein the first occupied volume of the space comprises at least a portion of the volume capacity of the space that is occupied by at least one item,
      receiving, from the spatial mapping and monitoring device, a second updated space map for the space, wherein the second updated space map comprises a second updated volume capacity of the space measured by the spatial mapping and monitoring device,
      determining, based at least in part on the first updated volume capacity of the space and the second updated volume capacity of the space, a second occupied volume of the space indicating an occupancy change within the space from the first occupied volume,
      determining whether the second occupied volume of the space falls below an occupancy threshold, and
      in response to determining that the second occupied volume of the space falls below the occupancy threshold, generating an alert.

2. The spatial telemeter alert reconnaissance system of claim 1, wherein the operations further comprise receiving, from a mobile communications device executing a spatial telemeter alert reconnaissance system device application, a plurality of space parameters to be utilized for the space, wherein the plurality of space parameters comprise a mapping frequency indicating a specified frequency at which spatial mapping of the space is to be performed and the occupancy threshold.

3. The spatial telemeter alert reconnaissance system of claim 2, wherein the first updated space map for the space and the second updated space map for the space are received in accordance with the mapping frequency.

4. The spatial telemeter alert reconnaissance system of claim 1, wherein the spatial mapping and monitoring device measures the volume capacity of the space, the first occupied volume of the space, and the second occupied volume of the space using at least one of an infrared spatial mapping technology, a camera-based spatial mapping technology, or a sound-based spatial mapping technology.

5. The spatial telemeter alert reconnaissance system of claim 1, wherein the operations further comprise sending the alert to a mobile communications device, and wherein the mobile communications device performs a task in response to the alert.

6. The spatial telemeter alert reconnaissance system of claim 1, wherein the operations further comprise sending the alert to a third party service, and wherein the third party service performs a task in response to the alert.

7. The spatial telemeter alert reconnaissance system of claim 1, wherein the operations further comprise:
   receiving, from the spatial mapping and monitoring device, a device identifier that uniquely identifies the spatial mapping and monitoring device; and
   storing, in a user account established via a spatial telemeter alert reconnaissance system device application executing on a mobile communications device, the device identifier of the spatial mapping and monitoring device in association with an identifier of the space and an identifier of a user of the mobile communications device.

8. A method comprising:
   receiving, by a spatial telemeter alert reconnaissance system, from a spatial mapping and monitoring device that is deployed within a space, an initial space map for the space, wherein the initial space map comprises a volume capacity of the space measured by the spatial mapping and monitoring device, and wherein the volume capacity of the space comprises a volume of the space unoccupied by an item;
   receiving, by the spatial telemeter alert reconnaissance system, from the spatial mapping and monitoring device, a first updated space map for the space, wherein the first updated space map comprises a first updated volume capacity of the space measured by the spatial mapping and monitoring device;
   determining, by the spatial telemeter alert reconnaissance system, based at least in part on the volume capacity of the space and the first updated volume capacity of the space, a first occupied volume of the space, wherein the first occupied volume of the space comprises at least a portion of the volume capacity of the space that is occupied by at least one item;
   receiving, by the spatial telemeter alert reconnaissance system, from the spatial mapping and monitoring device, a second updated space map for the space, wherein the second updated space map comprises a second updated volume capacity of the space measured by the spatial mapping and monitoring device;
   determining, by the spatial telemeter alert reconnaissance system, based at least in part on the first updated volume capacity of the space and the second updated volume capacity of the space, a second occupied volume of the space indicating an occupancy change within the space from the first occupied volume;

determining, by the spatial telemeter alert reconnaissance system, whether the second occupied volume of the space falls below an occupancy threshold; and in response to determining that the second occupied volume of the space falls below the occupancy threshold, generating, by the spatial telemeter alert reconnaissance system, an alert.

9. The method of claim 8, further comprising receiving, from a mobile communications device executing a spatial telemeter alert reconnaissance system device application, a plurality of space parameters to be utilized for the space, wherein the plurality of space parameters comprise a mapping frequency indicating a specified frequency at which spatial mapping of the space is to be performed and the occupancy threshold.

10. The method of claim 9, wherein the first updated space map for the space and the second updated space map for the space are received in accordance with the mapping frequency.

11. The method of claim 8, wherein the spatial mapping and monitoring device measures the volume capacity of the space, the first occupied volume of the space, and the second occupied volume of the space using at least one of an infrared spatial mapping technology, a camera-based spatial mapping technology, or a sound-based spatial mapping technology.

12. The method of claim 8, further comprising sending the alert to a mobile communications device, and wherein the mobile communications device performs a task in response to the alert.

13. The method of claim 8, further comprising sending the alert to a third party service, and wherein the third party service performs a task in response to the alert.

14. The method of claim 8, further comprising:
receiving, from the spatial mapping and monitoring device, a device identifier that uniquely identifies the spatial mapping and monitoring device; and
storing, in a user account established via a spatial telemeter alert reconnaissance system device application executing on a mobile communications device, the device identifier of the spatial mapping and monitoring device in association with an identifier of the space and an identifier of a user of the mobile communications device.

15. A computer-readable storage medium comprising instructions that, when executed by a processor of a spatial telemeter alert reconnaissance system, cause the processor to perform operations comprising:
receiving, from a spatial mapping and monitoring device that is deployed within a space, an initial space map for the space, wherein the initial space map comprises a volume capacity of the space measured by the spatial mapping and monitoring device, and wherein the volume capacity of the space comprises a volume of the space unoccupied by an item;
receiving, from the spatial mapping and monitoring device, a first updated space map for the space, wherein the first updated space map comprises a first updated volume capacity of the space measured by the spatial mapping and monitoring device;
determining, based at least in part on the volume capacity of the space and the first updated volume capacity of the space, a first occupied volume of the space, wherein the first occupied volume of the space comprises at least a portion of the volume capacity of the space that is occupied by at least one item;
receiving, from the spatial mapping and monitoring device, a second updated space map for the space, wherein the second updated space map comprises a second updated volume capacity of the space measured by the spatial mapping and monitoring device;
determining, based at least in part on the first updated volume capacity of the space and the second updated volume capacity of the space, a second occupied volume of the space indicating an occupancy change within the space from the first occupied volume;
determining whether the second occupied volume of the space falls below an occupancy threshold; and
in response to determining that the second occupied volume of the space falls below the occupancy threshold, generating an alert.

16. The computer-readable storage medium of claim 15, wherein the operations further comprise receiving, from a mobile communications device executing a spatial telemeter alert reconnaissance system device application, a plurality of space parameters to be utilized for the space, wherein the plurality of space parameters comprise a mapping frequency indicating a specified frequency at which spatial mapping of the space is to be performed and the occupancy threshold.

17. The computer-readable storage medium of claim 16, wherein the first updated space map for the space and the second updated space map for the space are received in accordance with the mapping frequency.

18. The computer-readable storage medium of claim 15, wherein the operations further comprise sending the alert to a mobile communications device, and wherein the mobile communications device performs a task in response to the alert.

19. The computer-readable storage medium of claim 15, wherein the operations further comprise sending the alert to a third party service, and wherein the third party service performs a task in response to the alert.

20. The computer-readable storage medium of claim 15, wherein the operations further comprise:
receiving, from the spatial mapping and monitoring device, a device identifier that uniquely identifies the spatial mapping and monitoring device; and
storing, in a user account established via a spatial telemeter alert reconnaissance system device application executing on a mobile communications device, the device identifier of the spatial mapping and monitoring device in association with an identifier of the space and an identifier of a user of the mobile communications device.

* * * * *